United States Patent
Nesbitt

(10) Patent No.: US 7,818,116 B1
(45) Date of Patent: Oct. 19, 2010

(54) PRESENTING A TRAVEL ROUTE IN A GROUND-BASED VEHICLE

(75) Inventor: David W. Nesbitt, Adamstown, MD (US)

(73) Assignee: MapQuest, Inc., Denver, CO (US)

( * ) Notice: Subject to any disclaimer, the term of this patent is extended or adjusted under 35 U.S.C. 154(b) by 1076 days.

(21) Appl. No.: 10/330,551

(22) Filed: Dec. 30, 2002

(51) Int. Cl.
*G01C 21/00* (2006.01)

(52) U.S. Cl. ............... 701/201; 701/202; 701/208; 701/211; 340/995.27; 340/955; 340/995.1; 340/990

(58) Field of Classification Search ......... 701/207–213, 701/201, 202; 340/995.14, 995.15, 995.27, 340/990, 955, 995.1, 995.11, 995.19, 995
See application file for complete search history.

(56) References Cited

U.S. PATENT DOCUMENTS

| | | | |
|---|---|---|---|
| 4,812,990 A | 3/1989 | Adams et al. | |
| 5,122,961 A * | 6/1992 | Toyama et al. | 701/208 |
| 5,179,519 A | 1/1993 | Adachi et al. | |
| 5,220,507 A | 6/1993 | Kirson | |
| 5,243,528 A | 9/1993 | Lefebvre | |
| 5,311,173 A | 5/1994 | Komura et al. | |
| 5,504,482 A | 4/1996 | Schreder | |
| 5,508,930 A | 4/1996 | Smith, Jr. | |
| 5,513,110 A | 4/1996 | Fujita et al. | |
| 5,559,707 A * | 9/1996 | DeLorme et al. | 701/200 |
| 5,568,390 A | 10/1996 | Hirota et al. | |
| 5,615,116 A | 3/1997 | Gudat et al. | |
| 5,664,115 A | 9/1997 | Fraser | |
| 5,712,788 A | 1/1998 | Liaw et al. | |
| 5,717,989 A | 2/1998 | Tozzoli et al. | |
| 5,752,217 A | 5/1998 | Ishizaki et al. | |
| 5,757,289 A | 5/1998 | Nimura et al. | |
| 5,797,106 A | 8/1998 | Murray et al. | |
| 5,802,492 A | 9/1998 | DeLorme et al. | |
| 5,848,373 A | 12/1998 | DeLorme et al. | |
| 5,850,193 A | 12/1998 | Shimoura et al. | |
| 5,884,213 A | 3/1999 | Carlson | |
| 5,910,177 A | 6/1999 | Zuber | |
| 5,911,773 A | 6/1999 | Mutsuga et al. | |

(Continued)

FOREIGN PATENT DOCUMENTS

EP      2000/50970 A2    8/2000

(Continued)

OTHER PUBLICATIONS

A novel ad hoc routing protocol research based on mobility prediction algorithm, by Meng, L.M.; Zang, J.X.; Fu, W.H.; Xu, Z.J.; in Wireless Communications, Networking and Mobile Computing, 2005. Proceedings. 2005.*

(Continued)

*Primary Examiner*—Cuong Nguyen
(74) *Attorney, Agent, or Firm*—Finnegan, Henderson, Farabow, Garrett & Dunner, LLP

(57) ABSTRACT

Techniques are provided for displaying a map for a route in a ground-based vehicle. The map includes a variable road network map showing finer detail for geographic features near the route and less detail for geographic features farther from the route. The map is displayed based on the travel direction of the ground-based vehicle.

17 Claims, 9 Drawing Sheets

U.S. PATENT DOCUMENTS

| | | | |
|---|---|---|---|
| 5,938,720 A | | 8/1999 | Tamai |
| 5,948,040 A | | 9/1999 | DeLorme et al. |
| 5,948,460 A | * | 9/1999 | Kang et al. ............... 426/548 |
| 5,974,419 A | | 10/1999 | Ashby |
| 5,991,689 A | | 11/1999 | Aito et al. |
| 6,016,485 A | | 1/2000 | Amakawa et al. |
| 6,023,655 A | | 2/2000 | Nomura |
| 6,038,559 A | | 3/2000 | Ashby et al. |
| 6,049,753 A | | 4/2000 | Nimura |
| 6,072,409 A | | 6/2000 | Fushimi et al. |
| 6,098,016 A | | 8/2000 | Ishihara |
| 6,101,484 A | | 8/2000 | Halbert et al. |
| 6,121,900 A | | 9/2000 | Takishita |
| 6,122,593 A | | 9/2000 | Friederich et al. |
| 6,124,810 A | | 9/2000 | Segal et al. |
| 6,128,574 A | | 10/2000 | Diekhans |
| 6,144,318 A | * | 11/2000 | Hayashi et al. ........ 340/995.19 |
| 6,151,588 A | | 11/2000 | Tozzoli et al. |
| 6,192,314 B1 | | 2/2001 | Khavakh et al. |
| 6,195,611 B1 | | 2/2001 | Sakamoto et al. |
| 6,202,026 B1 | | 3/2001 | Nimura et al. |
| 6,236,972 B1 | | 5/2001 | Shkedy |
| 6,246,957 B1 | | 6/2001 | Barrer et al. |
| 6,249,742 B1 | | 6/2001 | Friederich et al. |
| 6,259,988 B1 | | 7/2001 | Galkowski et al. |
| 6,260,019 B1 | | 7/2001 | Courts |
| 6,263,277 B1 | | 7/2001 | Tanimoto et al. |
| 6,266,651 B1 | | 7/2001 | Woolston |
| 6,278,935 B1 | | 8/2001 | Kaplan et al. |
| 6,278,939 B1 | | 8/2001 | Robare et al. |
| 6,278,942 B1 | | 8/2001 | McDonough |
| 6,282,489 B1 | | 8/2001 | Bellesfield et al. |
| 6,285,950 B1 | | 9/2001 | Tanimoto |
| 6,289,277 B1 | | 9/2001 | Feyereisen et al. |
| 6,292,743 B1 | | 9/2001 | Pu et al. |
| 6,292,745 B1 | | 9/2001 | Robare et al. |
| 6,317,685 B1 | | 11/2001 | Kozak et al. |
| 6,321,158 B1 | * | 11/2001 | DeLorme et al. ............ 701/201 |
| 6,323,894 B1 | | 11/2001 | Katz |
| 6,324,470 B1 | | 11/2001 | White |
| 6,338,021 B1 | | 1/2002 | Yagyu et al. |
| 6,349,261 B1 | | 2/2002 | Ohnishi et al. |
| 6,351,707 B1 | | 2/2002 | Ichikawa |
| 6,356,911 B1 | | 3/2002 | Shibuya |
| 6,397,145 B1 | | 5/2002 | Millington |
| 6,401,027 B1 | | 6/2002 | Xu et al. |
| 6,421,606 B1 | | 7/2002 | Asai et al. |
| 6,424,355 B2 | | 7/2002 | Watanabe et al. |
| 6,424,910 B1 | | 7/2002 | Ohler et al. |
| 6,424,912 B1 | | 7/2002 | Correia et al. |
| 6,427,119 B1 | | 7/2002 | Stefan et al. |
| 6,430,501 B1 | | 8/2002 | Slominski |
| 6,434,484 B1 | | 8/2002 | Lee |
| 6,438,561 B1 | | 8/2002 | Israni et al. |
| 6,446,110 B1 | * | 9/2002 | Lection et al. .............. 709/203 |
| 6,449,601 B1 | | 9/2002 | Friedland et al. |
| 6,456,933 B1 | | 9/2002 | Hessing |
| 6,463,384 B1 | | 10/2002 | Kaplan et al. |
| 6,526,335 B1 | | 2/2003 | Treyz et al. |
| 6,529,821 B2 | | 3/2003 | Tomasi et al. |
| 6,553,346 B1 | | 4/2003 | Walker et al. |
| 6,574,553 B1 | | 6/2003 | Beesley et al. |
| 6,577,937 B1 | | 6/2003 | Shuman et al. |
| 6,591,188 B1 | | 7/2003 | Ohler |
| 6,601,073 B1 | | 7/2003 | Robare |
| 6,647,336 B1 | | 11/2003 | Iwata |
| 6,671,615 B1 | | 12/2003 | Becker et al. |
| 6,708,110 B2 | | 3/2004 | Stefan et al. |
| 6,725,156 B2 | | 4/2004 | Kaplan |
| 6,728,630 B1 | | 4/2004 | Burt et al. |
| 6,785,608 B1 | | 8/2004 | Milici et al. |
| 6,922,633 B2 | | 7/2005 | Takenaka |
| 6,996,469 B2 | | 2/2006 | Lau et al. |
| 7,069,228 B1 | | 6/2006 | Rose et al. |
| 7,079,945 B1 | | 7/2006 | Kaplan |
| 7,082,443 B1 | | 7/2006 | Ashby |
| 7,089,264 B1 | | 8/2006 | Guido et al. |
| 7,095,964 B2 | | 8/2006 | Dougherty et al. |
| 7,133,771 B1 | | 11/2006 | Nesbitt |
| 7,133,835 B1 | | 11/2006 | Fusz et al. |
| 7,321,824 B1 | | 1/2008 | Nesbitt |
| 7,356,405 B1 | | 4/2008 | Nesbit |
| 7,474,960 B1 | | 1/2009 | Nesbitt |
| 2001/0018660 A1 | | 8/2001 | Sehr |
| 2001/0020213 A1 | | 9/2001 | Hatano |
| 2001/0021895 A1 | | 9/2001 | Yamazaki |
| 2001/0047241 A1 | | 11/2001 | Khavakh et al. |
| 2001/0056325 A1 | | 12/2001 | Pu et al. |
| 2002/0011941 A1 | * | 1/2002 | Endo et al. ................. 340/995 |
| 2002/0077745 A1 | | 6/2002 | Ohmura et al. |
| 2002/0087262 A1 | | 7/2002 | Bullock et al. |
| 2002/0183922 A1 | | 12/2002 | Tomasi et al. |
| 2003/0036848 A1 | | 2/2003 | Sheha et al. |
| 2003/0046000 A1 | | 3/2003 | Morita et al. |
| 2003/0060973 A1 | | 3/2003 | Mathews et al. |
| 2003/0065805 A1 | | 4/2003 | Barnes, Jr. |
| 2003/0093219 A1 | | 5/2003 | Schultz et al. |
| 2003/0120423 A1 | | 6/2003 | Cochlovius et al. |
| 2003/0126040 A1 | | 7/2003 | Mesaros |
| 2003/0182052 A1 | * | 9/2003 | DeLorme et al. ............ 701/201 |
| 2004/0012505 A1 | | 1/2004 | Yokota |
| 2004/0042405 A1 | | 3/2004 | Nesbitt |
| 2004/0044465 A1 | | 3/2004 | Nesbitt |
| 2004/0044466 A1 | | 3/2004 | Nesbitt |
| 2004/0052239 A1 | | 3/2004 | Nesbitt |
| 2004/0176907 A1 | | 9/2004 | Nesbitt |
| 2008/0114535 A1 | | 5/2008 | Nesbitt |
| 2008/0147313 A1 | | 6/2008 | Nesbitt |

FOREIGN PATENT DOCUMENTS

| | | | |
|---|---|---|---|
| WO | WO 1999/17080 | | 4/1999 |
| WO | WO 00/22593 | | 4/2000 |
| WO | WO 2006/060340 | * | 6/2006 |

OTHER PUBLICATIONS

International Conference on, vol. 2, Sep. 23-26, 2005 pp. 791-794, Digital Object Identifier 10.1109/WCNM.2005.1544171.*

QoS provisioning in clusters: an investigation of router and NIC design, by Ki Hwan Yum; Eun Jung Kim; Das, C.R.; in Computer Architecture, 2001. Proceedings. 28th Annual International Symposium on, Jun. 30-Jul. 4, 2001 pp. 120-129, Digital Object Identifier 10.1109/ISCA.2001.937441.*

From Internet, Unknown author, PowerPoint Maps You EditUSA, States, World and more. Allmaps ready to use. Buy 24/7.www.PresentationMaps.com, unknown date.*

A novel ad hoc routing protocol research based on mobility prediction algorithm, by Meng, L.M.; Zang, J.X.; Fu, W.H.; Xu, Z.J.; in Wireless Communications, Networking and Mobile Computing, 2005. Proceedings. 2005 International Conference on, vol. 2, Sep. 23-26, 2005 pp. 791 - 794, Digital Object Identifier 10.1109/WCNM. 2005.1544171.*

QoS provisioning in clusters: an investigation of router and NIC design, by Ki Hwan Yum; Eun Jung Kim; Das, C.R.; in Computer Architecture, 2001. Proceedings. 28th Annual International Symposium on, Jun. 30-Jul. 4, 2001 pp. 120 - 129, Digital Object Identifier 10.1109/ISCA2001.937441.*

Bergholm et al., " Analysis of Current Approaches in Vision-Based Navigation," from hitp://72.14.203.104/search?, printed on Apr. 28, 2006.

Bertino et al., "Navigational accesses in a temporal object model," Knowledge and Data Engineering, IEEE Transactions on, vol. 10, Issue 4, Jul.-Aug. 1998, pp. 656-665, Digital Object Identifier 10.1109/69.706062.

Chen et al., "Reliable pre-trip multi-path planning and dynamic adaptation for a centralized road navigation system," Intelligent Transportation Systems, 2005 Proceedings, 2005 IEEE, Sep. 13-15, 2005, pp. 257-262, Digital Object Identifier 10.1109/ITSC.2005.1520057.

U.S. Appl. No. 10/330,563 filed Dec. 30, 2002, 47 pages.

Deiss, "Garmin GPS Feature Comparisons and Upgrade Information," Apr. 7, 2006.

Edelkamp et al., "Geometric travel planning," Intelligent Transportation Systems, IEEE Transactions on vol. 6, Issue 1, Mar. 2005, pp. 5-16, Digital Object Identifier 10.1109/TITS.2004.838182.

Fleischman, "Research and Evaluation Plans for the TravTek IVHS Operational Field Test," General Motors Research Labs, Operating Sciences Dept., unknown date, pp. 827-837.

From Internet, Unknown author, PowerPoint Maps You EditUSA, States, World and more. All maps ready to use, Buy 24/7.www.PresentationMaas.com, unknown date.

From Internet, Unknown author, Presentation Style Impact, Present yourself with charisma and impact. Small group workshops! MarieMoran.com/PresentationStyle, unknown date.

Guzolek et al., "Real-time Route Planning in Road Networks," Vehicle Navigation and Information Systems Conference, 1989. Conference Record Toronto, Ontario, Canada, Sep. 11-13, 1989, New York, NY, USA, IEEE, US, Sep. 11, 1989, pp. 165-169, XP010034444, ISBN: 09692316-2-8.

Haigron et al.,"Depth-map-based scene analysis for active navigation in virtual angioscopy," Medical Imaging, IEEE Transactions on, vol. 23, Issue 11, Nov. 2004, pp. 1380-1390, Digital Object Identifier 10.1109/TMI.2004.836869.

Lankenau et al., "A versatile and safe mobility assistant," Robotics & Automation Magazine, IEEE, vol. 8, Issue 1, Mar. 2001, pp. 29-37, Digital Object Identifier 10.1109/100.924355.

Meng et al., "A novel ad hoc routing protocol research based on mobility prediction algorithm," in Wireless Communications, Networking and Mobile Computing, 2005, Proceedings, 2005 International Conference on vol. 2, Sep. 23-26, 2005, pp. 791-794, Digital Object Identifier 10.1109/WCNM.2005.1544171.

Nelson et al., "Vehicle-Based Route Planning in Advanced Traveler Information Systems," Intelligent Vehicles '93 Symposium, Tokyo, Japan, Jul. 14-16, 1993, New York, NY, USA, IEEE, US, Jul. 14, 1993, pp. 152-156, XP010117308, ISBN: 0/7803-1370-4.

Notice of Allowance issued in U.S. Appl. No. 11/136,377 mailed Nov. 16, 2007, 7 pages.

Office Action issued in U.S. Appl. No. 10/259,788 mailed Apr. 9, 2007, 11pages.

Office Action issued in U.S. Appl. No. 10/259,788 mailed Jan. 23, 2008, 13 pages.

Office Action issued in U.S. Appl. No. 10/259,789 mailed Feb. 27, 2007, 9 pages.

Office Action issued in U.S. Appl. No. 10/259,789 mailed Jul. 8, 2003, 16 pages.

Office Action issued in U.S. Appl. No. 10/259,793 mailed Jun. 11, 2008, 12 pages.

Office Action issued in U.S. Appl. No. 10/330,550 mailed Aug. 16, 2005, 14 pages.

Office Action issued in U.S. Appl. No. 10/330,560 mailed July17, 2007, 9 pages.

Office Action issued in U.S. Appl. No. 10/330,563 mailed Oct. 4, 2004, 8 pages.

Office Action issued in U.S. Appl. No. 10/330,563 mailed Nov. 8, 2005, 8 pages.

Office Action issued in U.S. Appl. No. 10/330,563 mailed Aug. 2, 2006, 6 pages.

Office Action issued in U.S. Appl. No. 10/330,563 mailed Dec. 27, 2006, 10 pages.

Office Action issued in U.S. Appl. No. 10/330,563 mailed Oct. 15, 2007, 12 pages.

Office Action issued in U.S. Appl. No. 10/330,563 mailed Mar. 6, 2008, 11 pages (PTO-892 blank).

Office Action issued in U.S. Appl. No. 10/330,669, mailed Jan. 7, 2004, 8 pages.

Office Action issued in U.S. Appl. No. 10/330,669, mailed Aug. 12, 2004, 9 pages.

Office Action issued in U.S. Appl. No. 10/800,728, mailed Oct. 7, 2004, 16 pages.

Office Action issued in U.S. Appl. No. 11/136,377 mailed Feb. 26, 2007, 11 pages.

Office Action issued in U.S. Appl. No. 11/136,377 mailed May 10, 2007, 11 pages.

Office Action issued in U.S. Appl. No. 11/136,377 mailed Jun. 30, 2006, 10 pages.

Office Communication issued in U.S. Appl. No. 10/330,550 mailed Nov. 5, 2007, 3 pages.

Supplemental European Search Report issued in European Patent Application No. EP 03 79 1794 dated Nov. 30, 2007.

Supplemental Notice of Allowance issued in U.S. Appl. No. 10/330,550 mailed Sep. 24, 2007, 19 pages.

Unknown author, Impressive Presentations, Quickly Create & Distribute-Impressive PresentationsFreeTrial, www.presentationengine.com, unknown date.

Unknown author, Maps You Can Edit, for Powerpoint Presentations, World, USA, States, Counties, Globe, www.MapsForDesign.com, unknown date.

Valavanis et al, "A case study of fuzzy-logic-based robot navigation," Robotics & Automation Magazine, IEEE, vol. 13, Issue 3, Sep. 2006, pp. 93-107, Digital Object Identifier 10.1109/MRA.2006.1678143.

Yang et al., "Path planning and evaluation in Ivhs databases," Vehicle Navigation and Information Systems Conference, 1991, vol. 2, Oct. 20-23, 1991, pp. 283-290.

Yum et al., "QoS provisioning in clusters: an investigation of router and NIC design," in Computer Architecture, 2001, Proceedings, 28th Annual International Symposium on Jun.30-Jul. 4, 2001, pp. 120-129, Digital Object Identifier 10.1109/ISCA.2001.937441.

Gurley, Creating a Great E-Commerce Business, Fortune, Mar. 16, 1998. http://money.cnn.com/magazine/fortune/fortune_archive/1998/03/16/239273/index.htm. Last accessed Dec. 2, 2008, 4 pages.

Koenig, et al. Quantitative Industrial Ecology. In: IEEE Transactions on Systems, Man and Cybernetics, Part C, vol. 28, Issue 1, Feb. 1998, pp. 16-28. http://ieeexplore.ieee.org/xpls/abs_all.jsp?arnumber=661087. Last accessed Dec. 2, 2008, 13 pages.

Nellore, et al. Factors Influencing Success in Integrated Product Development (IPD) Projects. IEEE Transactions on Engineering Management, vol. 48, issue 2, May 2001, pp. 164-174. http://ieeexplore.ieee.org/application/mdl/mdlfilecabinet.jsp?year=2008&month=12. Last accessed Dec. 2, 2008, 11 pages.

Gaonkar, et al. Strategic Sourcing and Collaborative Planning in Internet-Enabled Supply Chain Networks Producing Multigeneration Products. IEEE Transactions on Automation Science and Engineering, vol. 2, issue 1, Jan. 2005, pp. 54-66. http://ieeexplore.ieee.org/application/mdl/mdlconfirmation.jsp?arnumber=01381367. Last accessed Dec. 2, 2008, 13 pages.

OA Dated Oct. 27, 2008 for U.S. Appl. No. 11/464,376, 13 pages.

* cited by examiner

PRESENTING A TRAVEL ROUTE IN A GROUND-BASED VEHICLE

TECHNICAL FIELD

This document relates to presenting a travel route that shows a route between an origin location and a destination location.

BACKGROUND

A travel route between an origin location and a destination location may be presented as a paper map with manually-highlighted routes for assistance in traveling from a departure point to a destination point. A computer system may draw a map for a travel route on a display screen. The map may be generated based on geographic information. The geographic information may include shape information, such as latitude and longitude coordinates, to properly draw the location of roads, highways, hydrology, cities, and other objects on the map. A computer system may generate narrative text, such as driving directions or walking directions, that describes a travel route.

SUMMARY

In one general aspect, the map displayed for a route in a ground-based vehicle includes a variable road network map showing finer detail for geographic features near the route and less detail for geographic features farther from the route. The location of the ground-based vehicle is received from a global positioning system, and the indication of the location of the ground-based vehicle is displayed on the map.

Implementations may include one or more of the following features. For example, an indication that the direction in which the ground-based vehicle is traveling has changed may be received, and the displayed map may be oriented based on the change in travel direction of the ground-based vehicle. The direction of ground-based vehicle travel may be received from an electronic compass, and a determination as to whether the ground-based vehicle has changed direction may be made based on the direction received. The displayed map may be oriented such that the travel direction of the ground-based vehicle includes a component toward the top of the displayed map.

Implementations of the techniques described may include a method or process, an apparatus or system, or computer software on a computer-accessible medium. The details of one or more implementations are set forth below. Other features will be apparent from the description and drawings, and from the claims.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

DETAILED DESCRIPTION

Techniques are provided for presenting a route in a ground-based vehicle. A map is displayed for a route and includes a variable road network map showing finer detail for geographic features near the route and less detail for geographic features farther from the route.

Techniques are provided for presenting a route that includes a detail map in which the maneuvers are within a predetermined distance from one another. The route presentation provides both a context map and detail route information. The detail route information typically is presented as a map and narrative travel route instructions. A context map and a detail map may use different scales when presenting route information. In general, more than one detail map is associated with a context map for a route. The context map provides context for the route by including both the origin location and the destination location for the route, and by adjusting the amount of detail presented such that the entire route is presented on a display. The detail map provides additional route information for a portion of the route.

The route presentation may be interactive. For example, the context map may include one or more user-selectable portions that, when clicked or otherwise selected, present a detail map associated with the user-selectable portion of the context map. The route presentation also may be user-controllable such that a user may select the portions of a route that are printed. The route presentation also may include a re-routing feature that allows a user to request identification of a new route that avoids a particular maneuver or maneuvers in a current route.

Figure 1:
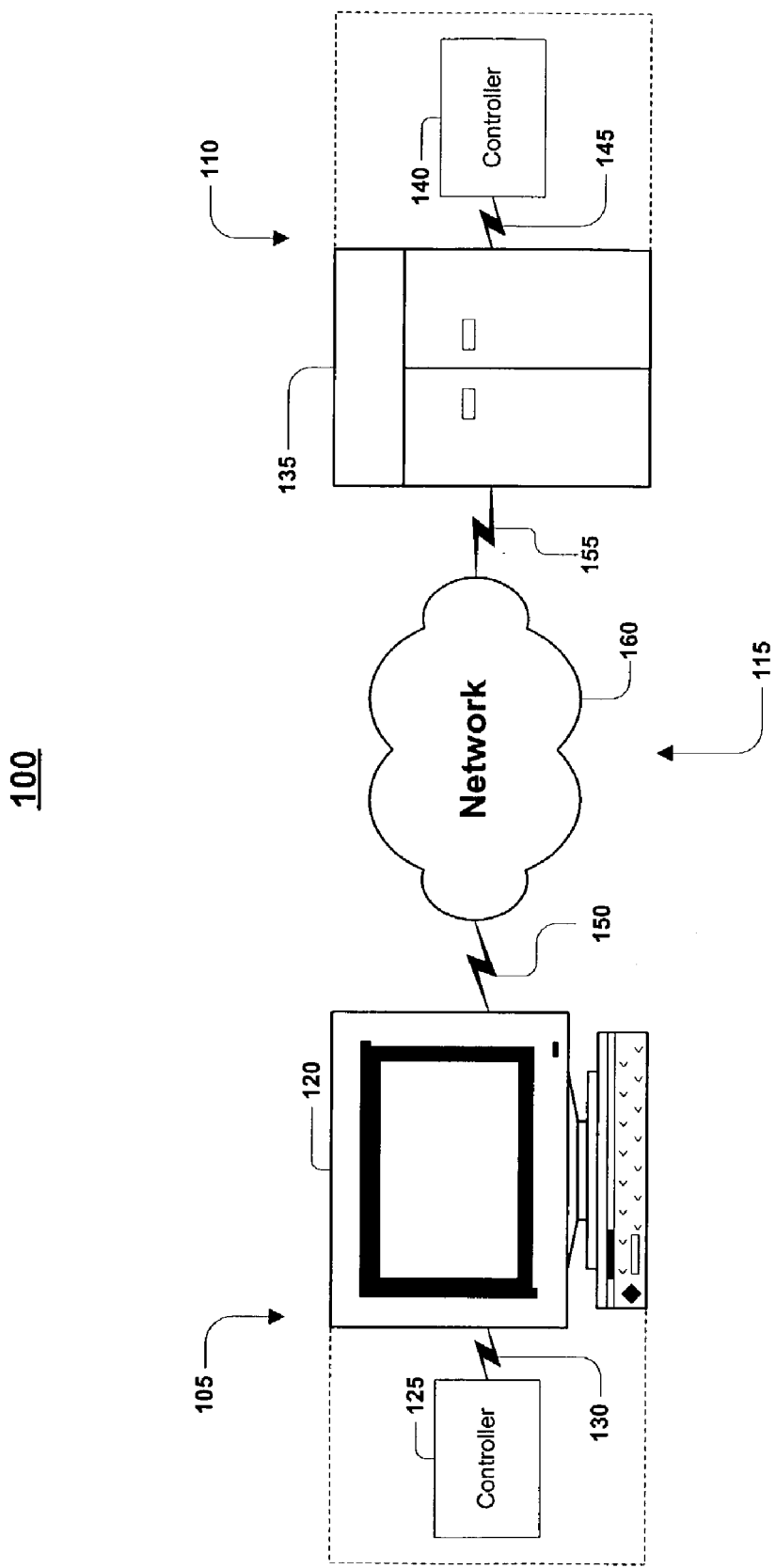
FIG. 1 is a block diagram of a communications system capable of presenting a route between origin and destination locations.
Figure 2:
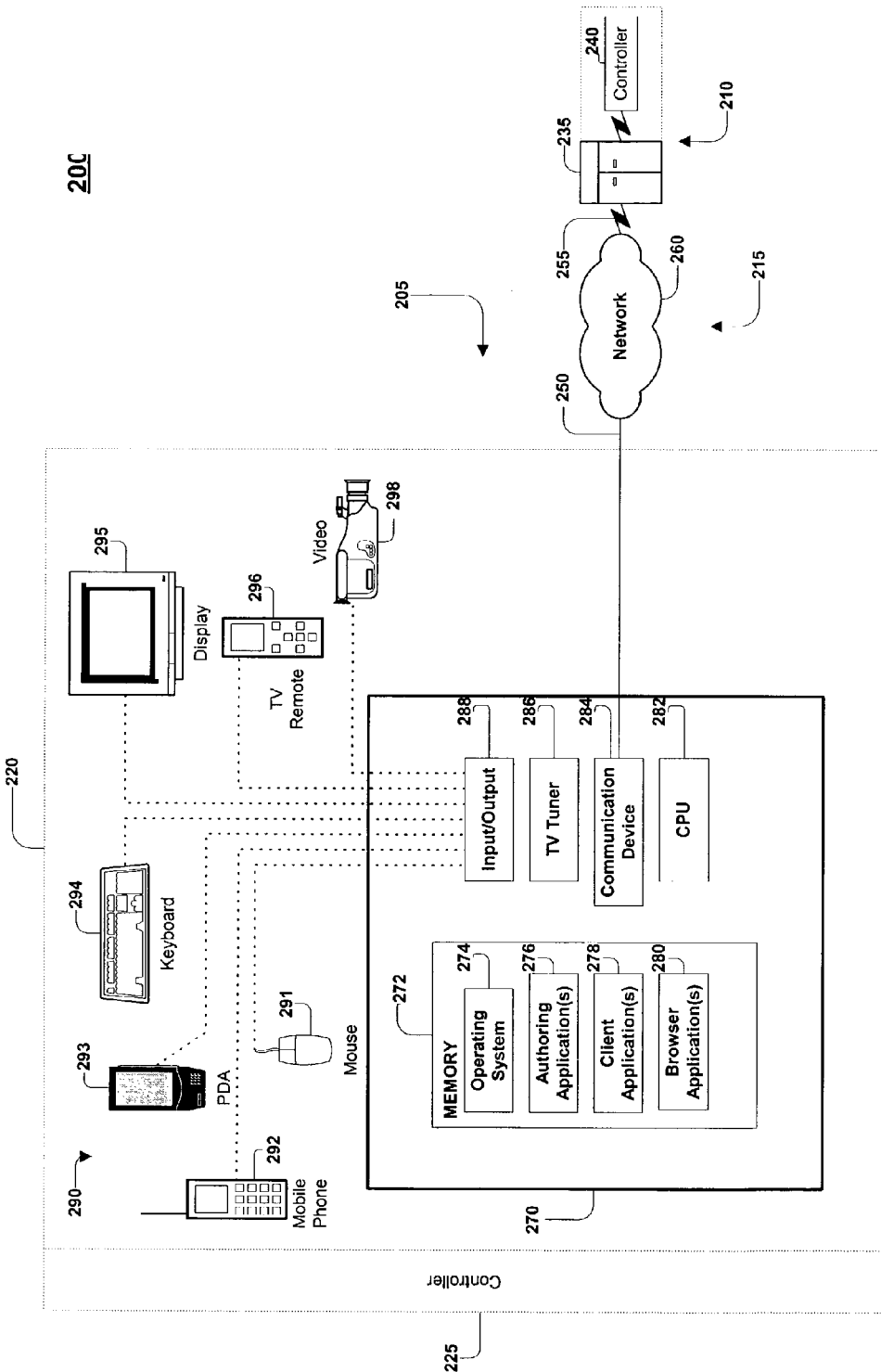
FIG. 2 is an expansion of the block diagram of FIG. 1.

For illustrative purposes, FIGS. 1 and 2 describe a communications system that may present a route between origin and destination locations.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

Each of the client device 120, the client controller 125, the host device 135, and the host controller 140 typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of the client controller 125 or the host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 that provides a direct or indirect communication link between the client system 105 and the host system 110, irrespective of physical separation. Examples of a delivery network 160 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communication system 200 including a client system 205 that communicates with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250 and 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and an ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer 270 typically includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by the communications device 284 and television programming content received by the TV tuner 286.

The general-purpose computer 270 typically includes an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as the mobile phone 292, the PDA 293, and the TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3:
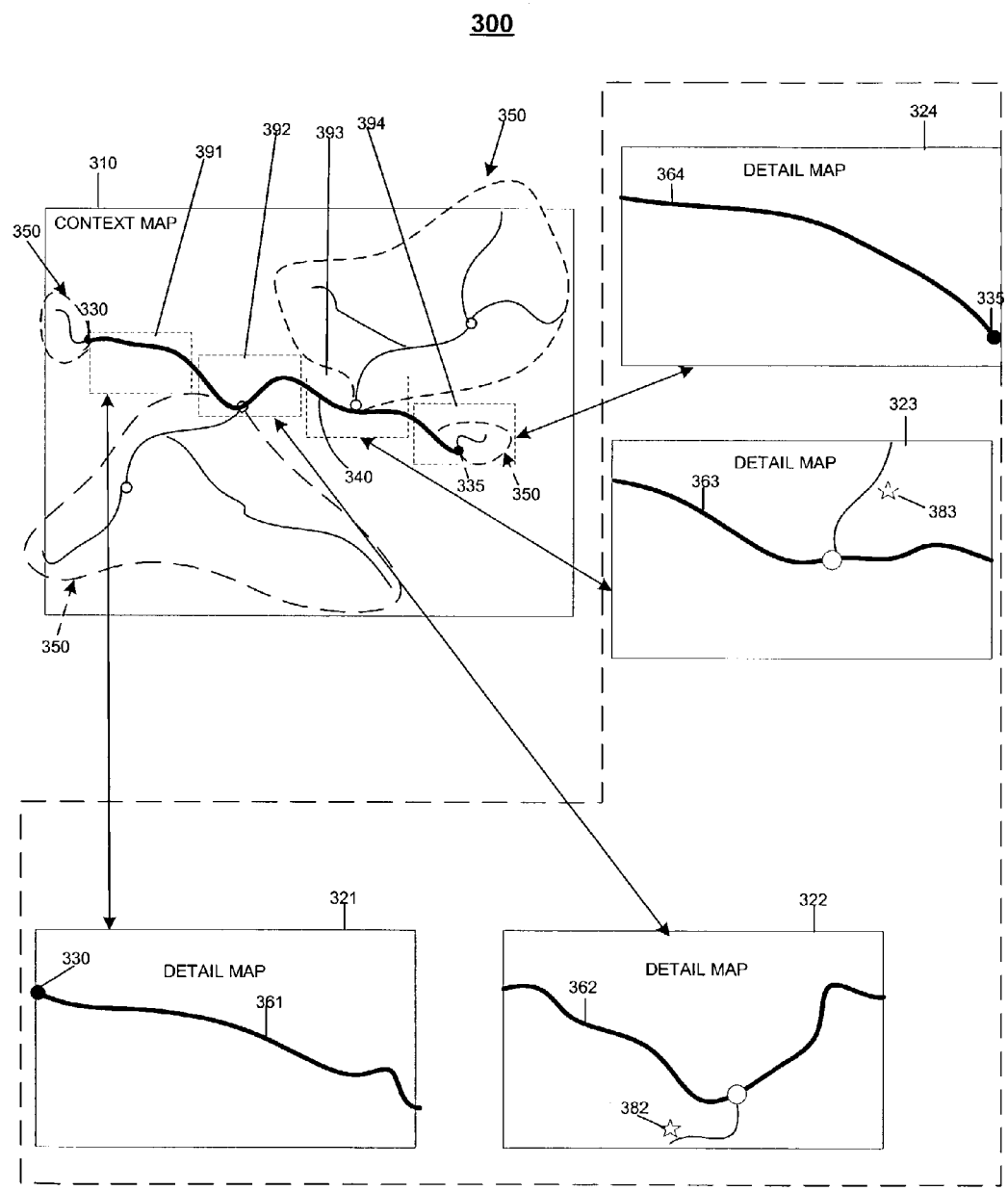
FIGS. 3 and 4 are diagrams illustrating route presentations that provide both context route information and detailed route information.

FIG. 3 illustrates a route presentation 300 that provides both context route information and detail route information. The route presentation 300 may be displayed on a client system display, such as the display 295 of FIG. 2. The route presentation 300 also may be printed on a printer associated with a client system, such as the client system 105 of FIG. 1 or the client system 205 of FIG. 2, or may be displayed on a display associated with an on-board vehicle navigation system. The context route information is presented in the form of a map and may be referred to as a context map 310 or an overview map.

The context map 310 includes an origin location 330, a destination location 335, and a route 340 between the origin location 330 and the destination location 335. The context map 310 is uniformly scaled. The use of a uniform scale avoids distortion of distances and spatial locations, which may be advantageous to a user of the context map 310. The context map 310 may use an aspect ratio that is optimized to provide the greatest route visibility when the context map 310 is displayed.

The context map 310 provides context for the route 340 by including geographic data 350 near the route. The geographic data 350 includes a variable road network display such that finer detail is provided near the route 340 and less detail, or even no detail, is provided farther away from the route 340. The geographic data 350 also may include other geographic features, such as hydrology (e.g., rivers) and cities. The context map 310 may include fewer labels for roads or other geographic features as compared to the number of labels included in the detail route information. Typically, the context map 310 includes only the labels necessary to show context and provide spatial awareness to the user of the route presentation 300.

The detail route information is presented as detailed maps 321-324. Each of detail maps 321-324 presents a portion 361-364, respectively, of the route 340. The detail map 321 includes the origin location 330, and the detail map 324 includes the destination location 335. In general, each of the detail maps 321-324 includes greater detail and geographic features than are included in the context map 310 for the corresponding portion of the route 340. For example, each of the detail maps 321-324 may include a full road network.

The detail maps 321-324 also may include places of interest to provide detail for portions 361-364 of the route 340. A place of interest (POI) may also be referred to as a point of interest. For example, the detail maps 322 and 323 include, respectively, POI 382 and POI 383. Examples of POIs include gas stations, restaurants, lodging, entertainment and educational opportunities (such as amusement parks, water parks, movie theaters, night spots, museums, and libraries), and historical or other types of landmarks.

The detail maps 321-324 represent a POI using a symbol, a bit-mapped image, or another type of image (collectively, "symbols"). A symbol may represent a type of POI (e.g., a lodging POI, a gas station, a historical landmark) or a particular POI (e.g., the United States Capitol or an amusement park may be represented by a particular symbol that is only used for that POI). Some implementations may use a single symbol to represent all POIs regardless of the type of the POI. The inclusion of POIs in the detail maps 321-324 may help a user to plan activities along the route. The inclusion of POIs also may provide an opportunity for the route presentation provider to obtain revenue by charging for the display of a POI on the detail maps, which may help create or invigorate a market for route presentation services.

In some implementations, a detail map may include different types of POIs along different portions of the route. For example, a route along a state road may include a scenic vista POI, a historic landmark POI, and a park POI, while a route along an interstate highway includes POIs for gas, food and lodging opportunities.

Additionally or alternatively, the types of POI presented may be based on the length of the route and the POI location along the route. For example, when a route is long and an overnight stay may be anticipated, convenience store POIs and gas station POIs may dominate the presentation of POIs near the origin location. As the route progresses, gas stations, fast-food restaurants, and hotels may dominate the presentation of POIs. Near the destination, hotels, full service restaurants, entertainment and nightspots, and tourist destinations may dominate the presentation of POIs. The types and proximities of POIs presented may be controllable by the user. For example, a user may select to drive eight hours in a day and hotels approximately eight hours away may be displayed (e.g., hotels that are less than six hours or more than ten hours are not displayed).

The context map 310 includes detail map indications 391-394, each of which indicates the portion of the route 340 included in a corresponding detail map. This may provide context such as where along the route the detail map is located (e.g., near the origin, near the destination, or in the middle of the route). The detail map location (or region of detail) may be indicated, for example, by an outline (here, a dotted outline), a transparent shaded region drawn over the overview map, or a representation of a magnifying glass.

A context map 310 and a detail map 321, 322, 323 or 324 may use different scales when presenting route information. A detail map 321, 322, 323 or 324 may use the same or different scale as another detail map 321, 322, 323 or 324 for the context map 310.

The route presentation 300 may be interactive. For example, the context map 310 may include one or more user-selectable portions that, when clicked or otherwise selected, present a corresponding detail map. The user-selectable portion may be the same as or different from the detail map indication 391-394 on the context map. The user also may select to re-display the context map 310 after viewing the detail map, for example, by activating a control, such as a button or icon. The control may be referred to as a user-selectable indicator associated with the context map. The user may select to display another detail map. The user may continue to switch between the context map and a detail map.

The interactive presentation of detail maps may be advantageous, particularly when a user is familiar with a portion of the route and does not wish to receive detailed route information for the portion. With an interactive display, the user is able to select the portions of the route for which the user requires additional detail.

In some implementations, the context map may be a static map that may not be re-scaled or re-centered by the user. This may provide more efficient updating methods, such as using overlay planes or a stored bitmap of the context map, that may avoid redrawing the map when the user re-displays the context map after the display of a detail map.

The route presentation also may be user-controllable such that a user may determine the portions of a route that are printed. This may be referred to as interactive print control. Interactive print control may allow greater user control over the printing of map route details. With interactive printing, the user is able to select the portions of the route for which the user requires additional detail and print only the selected portions. For example, the user may select one or more detail maps to be printed. This may be particularly advantageous when a user is familiar with a portion of the route, such as a portion of the route near the home of the user, and the user only wants to print the portion of the route that is unfamiliar or not as familiar to the user.

The route presentation 300 may be implemented by using a client application, such as client application 278 of FIG. 2, on a client system, such as the client system 105 of FIG. 1 or the client system 205 of FIG. 2. The host system, such as the host system 110 of FIG. 1 or the host system 210 of FIG. 2, may send data associated with the context map 310 to the client system for display. While the client system displays the context map 310, the host system sends the data associated with the detail maps 321-324 to the client system such that the detail map data is available at the client system when the user wants to display a detail map 321, 322, 323 or 324.

Figure 4:
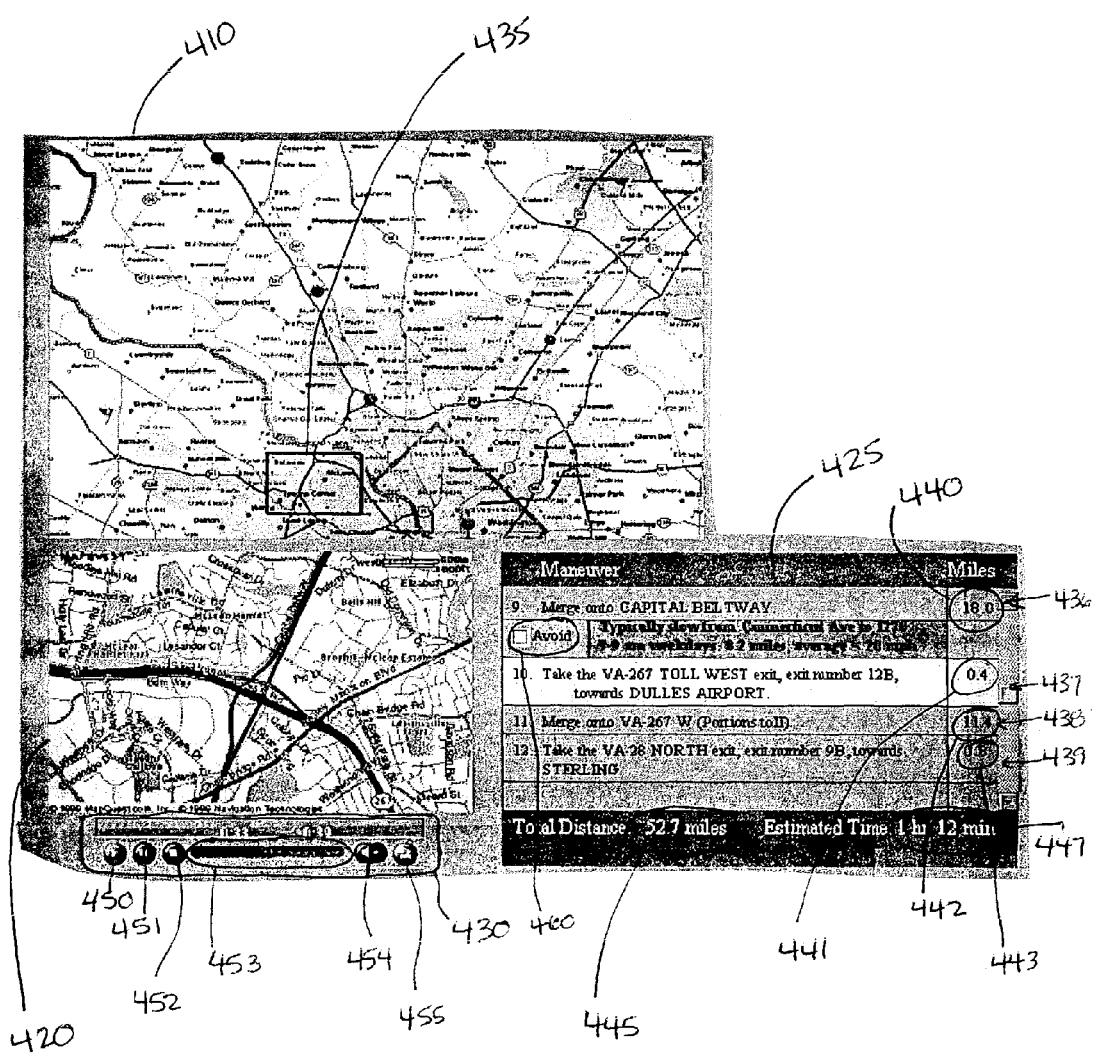

FIG. 4 describes a particular implementation of a route presentation 400 that provides context route information and detail route information, and includes interactive controls. The route presentation 400 may be displayed on a client system display, such as display 295 of FIG. 2, displayed on an on-board vehicle navigation system, or printed. The route presentation 400 includes a context map portion 410, a detail inset map portion 420, a narrative driving direction portion 425, and an animation control 430.

The context map portion 410 displays a context map that provides a variable road network display across the map such that finer detail is presented on the map near the route and less detail is presented on the map farther away from the route, as described previously with respect to context map 310 of FIG. 3. The context map portion 410 includes an indication 435 of the location of the detail insert map 420.

The detail insert map portion 420 presents a detail insert map that includes a complete road network and labels, as described previously with respect to detail maps 321-324 of FIG. 3 for a portion of the route. The detail insert map also may include POIs and geographic features to provide detail for the area covered by the detail map. The detailed insert map portion 420 uses a display area having a fixed geometric shape (e.g., rectangular) and a fixed size.

The detail insert map includes the maneuvers that occur within a predetermined distance of one another. Such a detailed map may be referred to as a maneuver map. The maneuvers are grouped to form a single detail insert map of multiple maneuvers. In the example shown by FIG. 4, the detail insert map includes the maneuvers of merging on a highway, exiting the highway at a particular toll road exit, merging on the toll road, and exiting the toll road at a particular exit toward a particular direction. Another detail insert map may include a series of turns in an urban area that occur within a predetermined distance (e.g., two miles) of one another.

In some implementations, a detail map may include a predetermined number of maneuvers that occur within a predetermined distance of one another. The predetermined number of maneuvers may be established based on a maximum number of maneuvers that may occur in one detail map, which may be particularly useful in an urban setting in which a large number of maneuvers may occur within a short distance.

A detail insert map that covers multiple maneuvers may be beneficial. For example, fewer detail maps are produced as compared with producing a separate detail map for each maneuver. This may result in display efficiency and a reduction in the number of pages required to print a route, that, in turn, may result in greater user satisfaction.

The narrative driving direction portion 425 displays a scrolling list of text descriptions of each maneuver 436-439 presented in order of occurrence as the route is traversed. Each of maneuvers 436-439 is associated with a corresponding one of distances 440-443 at which the maneuver occurs relative to the previous maneuver. The narrative driving directions portion 425 includes a total distance of the route 445 and an amount of time estimated to travel the route 447. The displayed maneuvers 436-439 correspond to the maneuvers shown within the detail inset map displayed in the detail inset map portion 420. In some implementations, the presented narrative driving directions may correspond to the position of a cursor or other type of indicator on the context map in the context map portion 410.

The presentation route 400 includes interactive controls that allow the user to display a detail insert map 420 and a maneuver in the narrative driving direction portion 425 that corresponds to a position on the context map in the context map portion 410 selected by the user. Similarly, when a user selects a particular maneuver included in the narrative driving directions portion 420, a cursor or other type of indicator may be presented on the overview map at a point that corresponds to the selected maneuver. A detail insert map 425 also may be automatically invoked or manually selected to present the selected maneuver. In some implementations, the interactive control may include controlling the display of a particular detail insert map only by selecting a position on the context map (e.g., the narrative driving directions do not control the display of a detail insert map).

The animation control 430 permits a user to play an animation of traveling the route that displays a series of detail insert maps 425 and narrative driving directions 425 associated with each detail insert map as the detail insert map is displayed. Each detail insert map is presented in order from the origin location to the destination location until all detail insert maps have been presented or the animation has been paused or stopped. POI information, such as text and/or one or more images associated with a POI, may be presented on the detail insert map in the detail insert map portion 425. Additionally or alternatively, POI information may be displayed in a separate POI portion or overlaid on the context map 410.

The animation control 430 may include a play control 450, a pause control 451, a stop control 452, a position control 453, and, optionally, volume controls 454 and 455. The user may use the play control 450 to start the animation sequence, the pause control 451 to pause the animation sequence such that the animation may be restarted from the point at which the animation was paused, and the stop control 452 to stop the animation sequence. The user may use the position control 453 (here, a sliding bar) to select the point in the route from which the animation will start when the play control 450 is selected.

In some implementations, audio may be associated with the route. For example, audio may be associated with a POI on or near the route. When audio is associated with the route, the volume of the audio may be controlled using volume controls 454 and 455. Volume control 454 increases the volume at which the audio associated with the route is played, while volume control 455 decreases the volume at which the audio associated with the route is played.

In some implementations, the POI information is displayed for a particular location along the route when the animation is stopped at the location. In such an implementation, the user may control the animation to stop at various points in the animation and determine what points of interest are on the route or near the location at which the animation is stopped.

In some implementations, the route presentation 400 may include alternative or additional interactive controls such that, when a user drags a cursor along, or otherwise selects, points along the route, the user may get a magnified image (e.g., a zoomed-in image) of the route that includes POI information.

The route presentation 400 includes an avoid indicator 460 that allows a user to avoid a particular maneuver in the route. For example, a user may wish to avoid traveling through a construction zone or a portion of a route in which the speed fluctuates, predictably or unpredictably, over the course of a day. When the user selects the avoid indicator 460, a different route is determined from the origin location to the destination location that does not include the maneuver associated with the avoid indicator 460 (e.g., maneuver 436). In some implementations, a user may indicate that more than one maneuver in a route is to be avoided.

The route presentation 400 may be implemented using a host system, such as the host system 110 of FIG. 1 or the host system 210 of FIG. 2, to send data for all or a portion of the map or route to a client system, such as the client system 105 of FIG. 1 or the client system 205 of FIG. 2. The client system stores the data received. In some cases, removable media may be used to transport map or route data to the client system. Storing route data or map data needed for the route presentation 400 may result in a more efficient display process than if the route data or map data is accessed from the host system. A more efficient display process may lead to a faster display process that may, in turn, result in improved user satisfaction.

Figure 5:
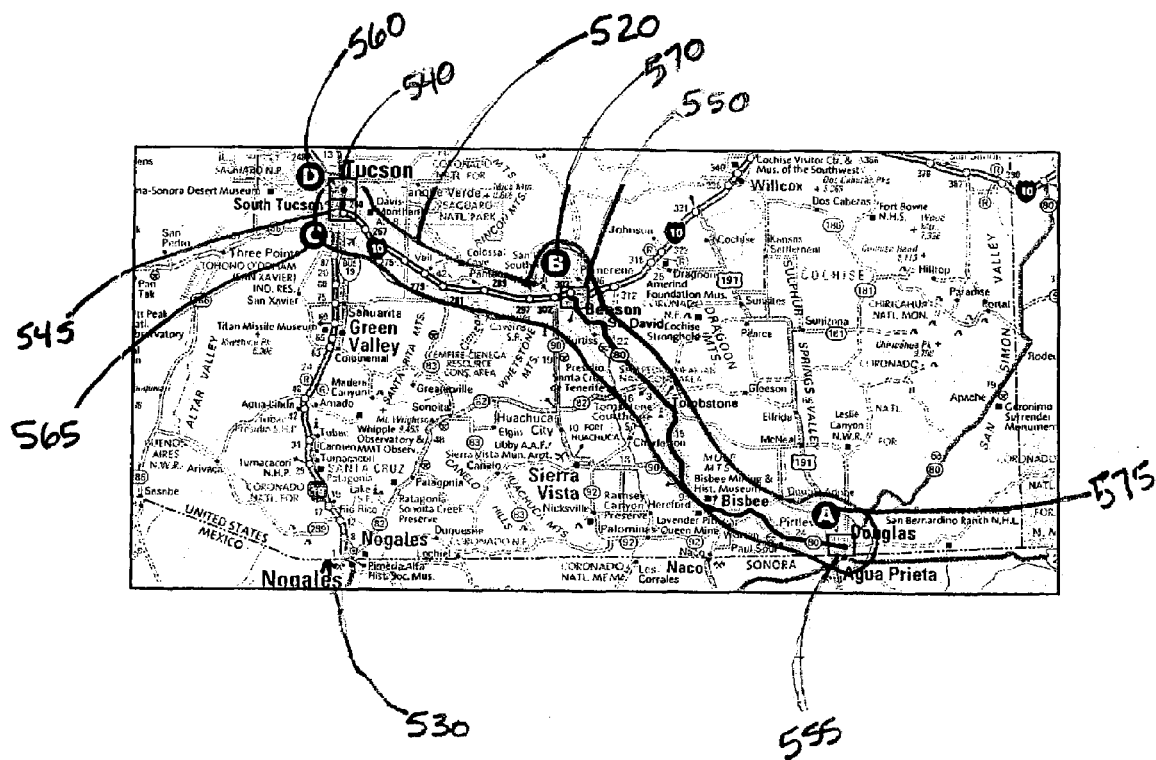
FIG. 5 is a diagram depicting a route presentation that emphasizes the route and provides context information.

FIG. 5 illustrates a particular implementation of a context map 510 that emphasizes the route and provides context information. Although not shown by FIG. 5, the context map 510 may use a vivid color or vivid colors to display the route 520, and a faded style of pastel colors or other desaturated colors for the non-route context information 530, such as geographic data 350 of FIG. 3. This may result in a context map 510 in which the vivid colors of the route 520 stand out over the faded style of the non-route context information 530 to emphasize the route 520. In this manner, the context map 510 emphasizes the route and provides context information for the route.

A route map that uses a faded style for non-route context information and a vivid style for route elements may be implemented by using two or more sets of style information to control the manner in which objects are displayed in the map. Style information may include, for example, color, width of lines, font size and type of text, or patterns that are associated with an element drawn with a particular style. A particular set of style information to present a faded style may be associated with the presentation of non-route objects (e.g., elements that are included in context information). This may be referred to as a faded style. Another set of style information to present a highlighted or vivid style may be associated with the presentation of route objects (e.g., roads, labels of roads, and labels of cities included in the route). This may be referred to as a vivid style or a highlighted style.

A map may be produced using the faded style as a default for objects in the map. Map elements included in the route may be displayed in a vivid style by using the vivid style to override the default faded style. Alternatively or additionally, a highlight line that is a wider line and/or a translucent color line (such as a purple translucent line or a yellow translucent line) may overlay the route elements in the display.

The context map 510 also includes detail map indications 540, 545, 550, 555 for detail maps that provide detail route information for the route 520. Each detail map indication 540, 545, 550 or 555 is associated with a label 560, 565, 570 or 575, respectively. As shown, each label may be presented in the form of a letter.

Figure 6:
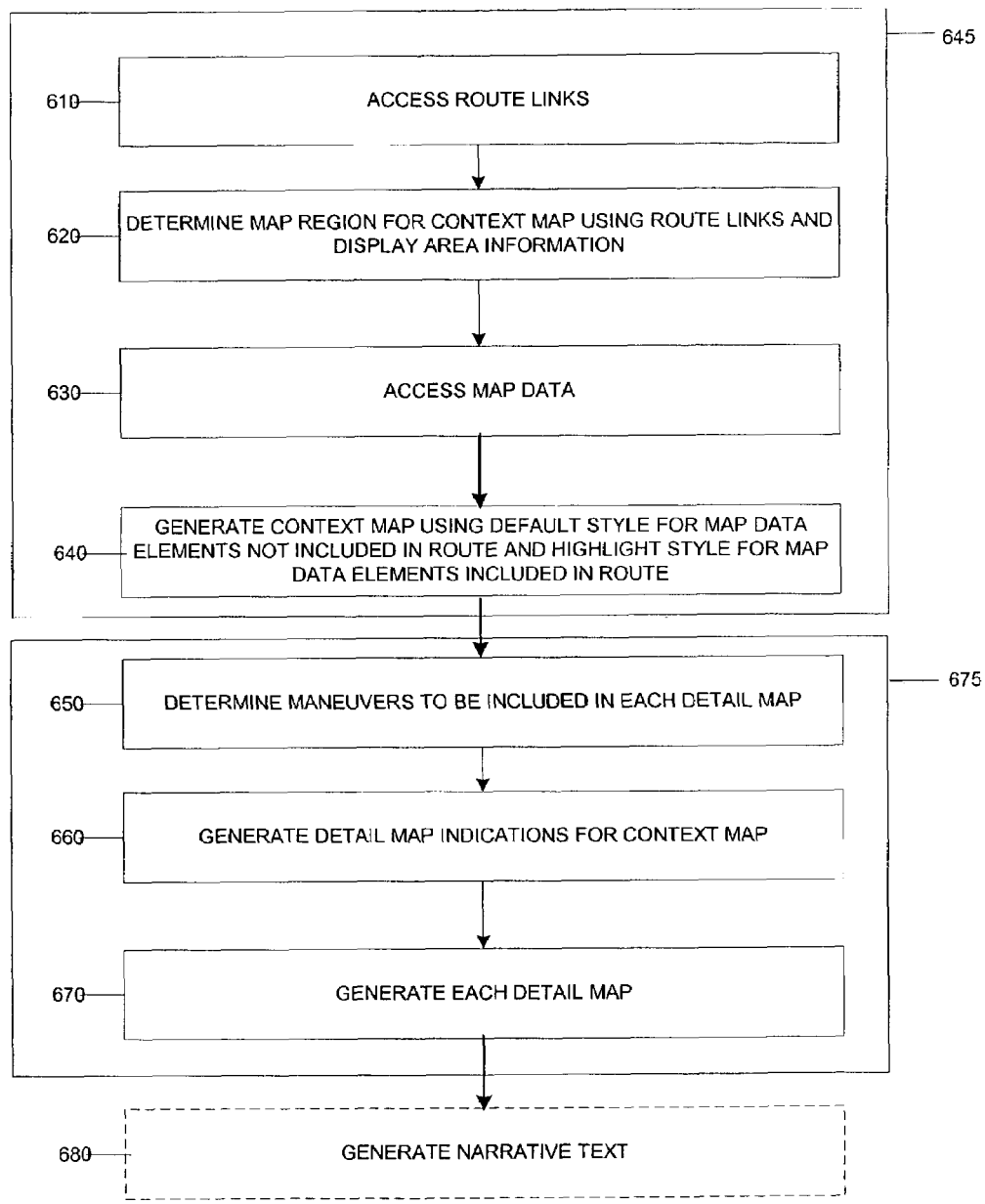
FIG. 6 is a flow chart showing a process that displays a context map that uses a combination of vivid styles and faded styles and detail maps associated with the context map.

FIG. 6 depicts a process 600 for displaying a context map with a combination of vivid and faded styles, as described previously with respect to context map 510 of FIG. 5, and detail maps associated with the context map. The process 600 causes the context map to be displayed for a particular implementation of a routing system that generates a route by processing directed links (e.g., one-way edges) in a graph that includes one or more links and two or more nodes. The graph represents a network of roads. The context map, for example, may be the context map 310 of FIG. 3, the context map 410 of FIG. 4, or the context map 510 of FIG. 5. The process 600 may be performed, for example, by a host system, such as the host system 110 of FIG. 1 or the host system 210 of FIG. 2.

The process 600 begins when the host system accesses one or more links that make up a route (step 610). The host system then determines a region for the context map, including the origin location and the destination location, based on the links accessed and the display area for the context map (step 620). For example, the host system may determine a route region for the context map by finding the best fit of the route links using a conventional best-fit process and adding margins around the edges such that the map region is a regular shape, such as a rectangle, and to fit the display area.

The host system then accesses map data that includes elements (or objects) for a particular portion of geographic data that includes the route to be presented (step 630). An example of an element includes a city, an item of hydrology, or a road that is to appear on the map. Each element in the map data may be associated with attribute information, a default style, and a highlight style. Attribute information may include an attribute identifier, an attribute name, and an attribute type. An attribute identifier uniquely identifies the element, and the attribute name reflects a name for the element. Elements may be grouped into one of several attribute types. Examples of an attribute type include a park, a road, or a body of water.

Each attribute is associated with geometry information that aids in generating the shape and other display attributes of an element to be displayed on a map. The geometry for an element may be determined through the use of a grid pattern or longitude and latitude markings for an element to be displayed.

Each attribute may be associated with a default style that denotes the way that the element is presented in a map when the element is not an element in the route. Each attribute also may be associated with a highlight style that denotes the manner in which the element is displayed in a map when the element is an element in a route. As discussed previously with respect to FIG. 5, the default style may be a faded style that includes pastel colors whereas the highlight style may use a vivid style that includes vivid colors.

The host system then generates the context map based on the determined map region and the accessed map data (step 640). The host system displays the elements in a context map using the default style for each element that is not included in the route and using a highlighted style for each element that is included in the route. Steps 610-640 may be referred to as a generate context map sub-process 645.

The host system determines the maneuvers to be included in each detail map (step 650). For example, the host system identifies maneuvers that occur within a predetermined distance of one another and groups the identified maneuvers. The group of identified maneuvers is included in a detail map, and the host system identifies another group of maneuvers. In some implementations, the host system may include only a single maneuver in a detail map. For example, a detail map may include only one maneuver when the detail map is for a long route and a maneuver during the middle of the route includes a turn from one interstate highway onto another interstate highway.

The host system generates an indication that corresponds to each detail map location on the context map (step 660). The detail map location may be indicated, for example, by an outline, a transparent shaded region, or representation of a magnifying glass, as described above with respect to FIG. 3.

The host system then generates each detail map (step 670). For each detail map, the host system may access map data, determine the map region using route links, and display area information for the links involved in the maneuvers included in the detail map, and generate the detail map.

Steps 650-670 may be referred to as a process map detail sub-process 675.

The host system may generate narrative text that corresponds to the route (step 680). The narrative text may be a scrolling list of text descriptions for each maneuver, such as the narrative driving portion 425 of FIG. 4.

Figure 7:
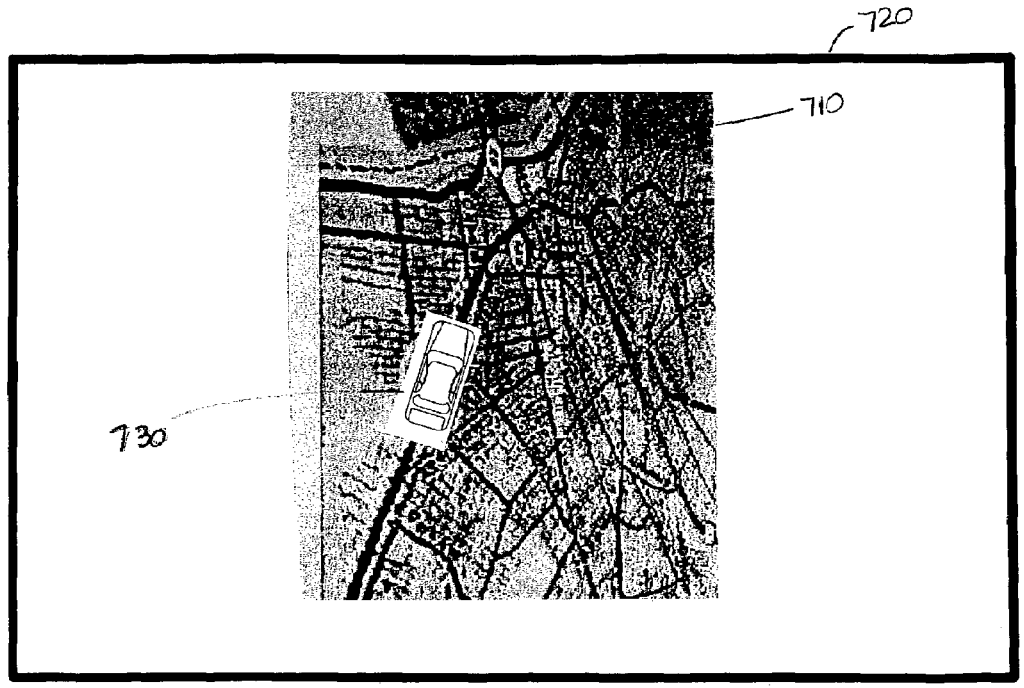
FIGS. 7 and 8 are diagrams illustrating the presentation of a route on an on-board navigation system.
Figure 8:
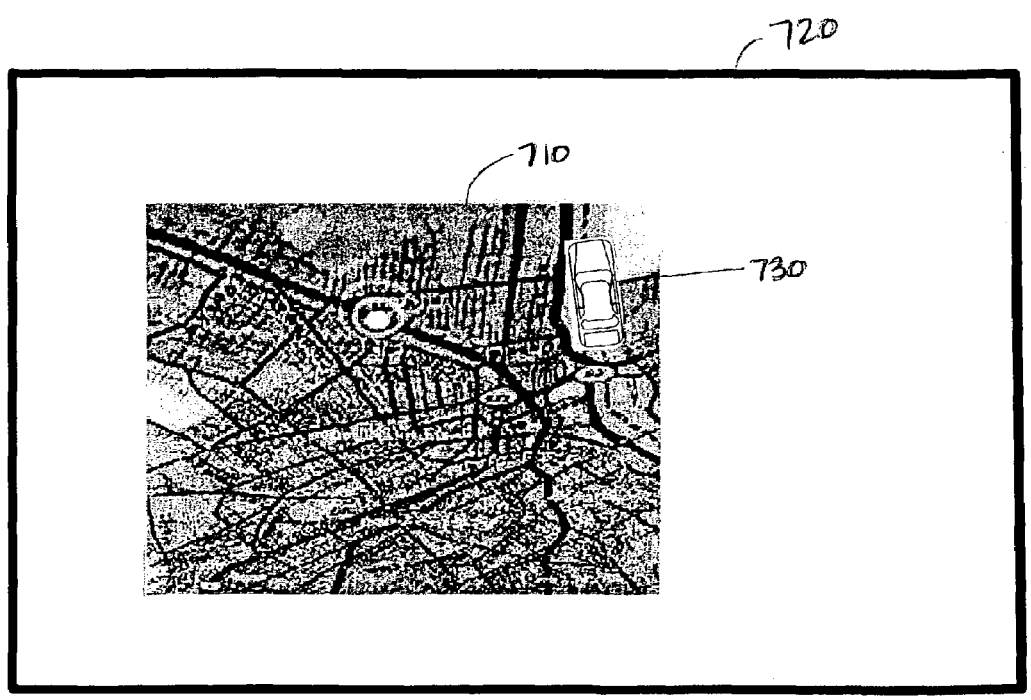

Referring to FIGS. 7 and 8, a map 710 of a route is presented on a display 720 in a vehicle traveling the route (e.g., the display is part of an on-board vehicle navigation system). The position of the vehicle is determined using, for example, a global positioning system (GPS) receiver, and the map 710 is re-oriented based on the position of the vehicle as the vehicle travels the route. The map 710 is a two-dimensional map that presents the perspective of traveling the route from a vehicle driver's perspective (e.g., slightly above the route). Some implementations may use a more conventional representation, such as the context map 310 of FIG. 3, the detail maps 321-324 of FIG. 3, the context map 410 of FIG. 4, the detail insert map 420 of FIG. 4, and the context map 510 of FIG. 5. The map includes a representation 730 of the vehicle that corresponds to the location of the vehicle on the map 710. The map 710 is re-oriented relative to the top of the display 720 such that the representation 730 of the vehicle moves toward the top of the display 720 as the vehicle traverses the route.

For example, initially a vehicle may be traveling in one direction, as illustrated in FIG. 7. When the vehicle travels in a different direction, the map 710 is re-oriented relative to the top of the display 720 as shown in FIG. 8. The representation 730 of the vehicle is depicted in FIG. 8 based on the actual location of the vehicle. In some implementations, a representation 730 of the vehicle may not be included in the display.

Figure 9:
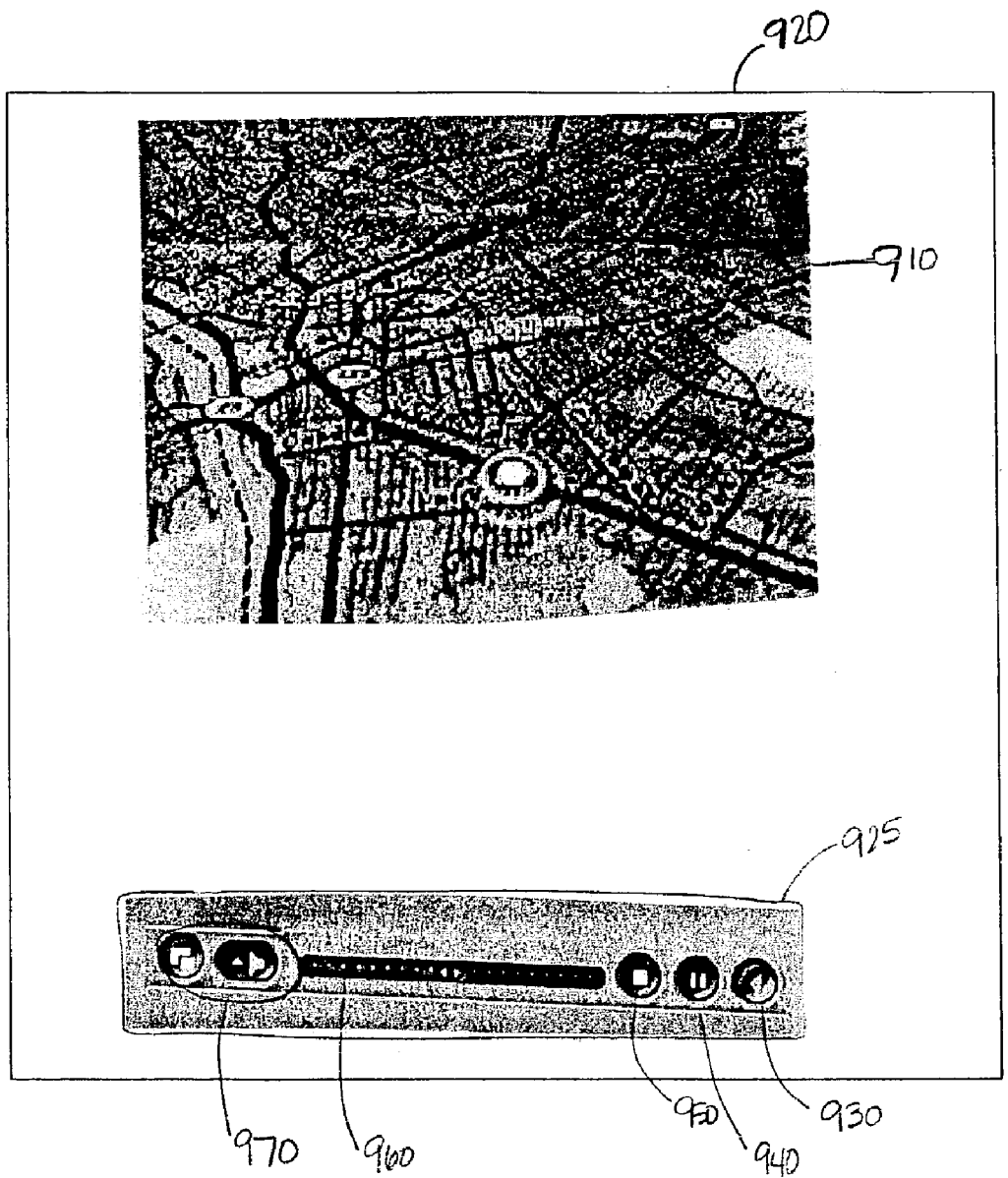
FIG. 9 is a diagram showing the presentation of a route.

FIG. 9 illustrates a map 910 of the route that may be animated in a display 920 regardless of the location of a vehicle. For example, an animated sequence of detail maps, such as detail maps 321-324 of FIG. 3, that include a representation of a vehicle traversing the route may be presented. A user may use animation controls 925 to control the animation. The user may use a play control 930 to start the animation sequence, a pause control 940 to pause the animation sequence such that the animation may be restarted from the point at which the animation was paused, and a stop control 950 to stop the animation sequence. The user also may use a position control 960 (here, a sliding bar) to select the position of the vehicle from which the animation will play when the play control 930 is selected.

One or more symbols (not shown) that represent POIs may be presented. Examples of POIs may include a restaurant, lodging (e.g., a hotel, motel, or inn), a gas station, an entertainment opportunity (e.g., movie theatre, a shopping mall, or an amusement park), a historical landmark, and a nature spot (e.g., a scenic overlook or park). The user may select a symbol displayed on the map and information associated with the symbol may be displayed. For example, a user may select a lodging symbol to invoke display of the name, address, and/or telephone number of a hotel associated with the lodging symbol.

In some implementations, the distance from the start of the route to the position of the vehicle representation on the route may be displayed, as may be an estimated amount of time to travel the distance. Audio may be presented to describe the route, points of interest along the route, or other information. When an implementation includes audio, the animation controls 925 may include volume controls 970 for increasing and decreasing the volume of the audio.

Figure 10:
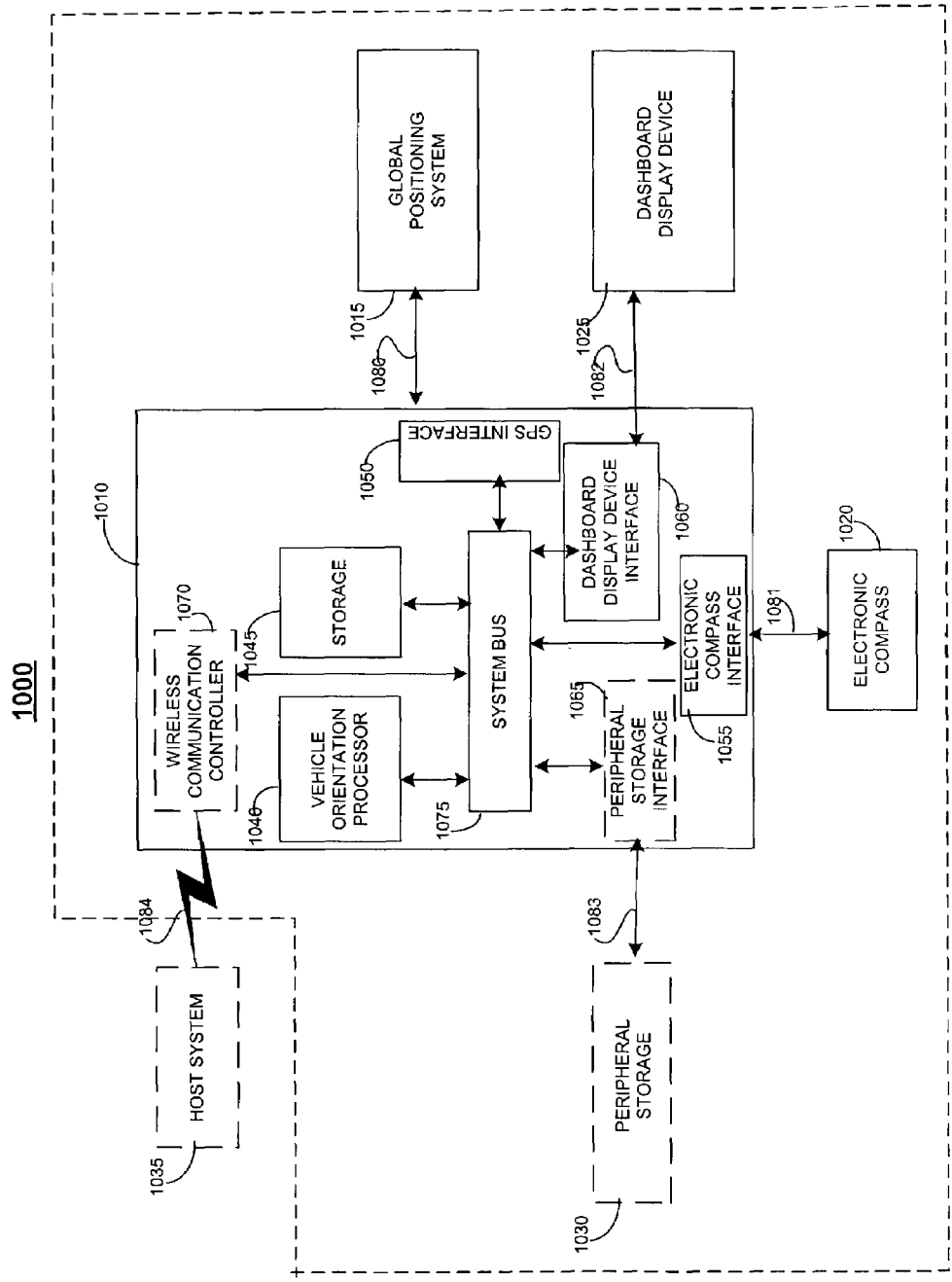
FIG. 10 is a block diagram illustrating a system for presenting on a vehicle display a map that is re-oriented based on the position of the vehicle.

Referring to FIG. 10, a system 1000 is capable of presenting on a vehicle display a map that is re-oriented based on vehicle position. The system 1000 includes a map display system 1010, a GPS 1015, an electronic compass 1020, and a dashboard display device 1025. The system 1000 optionally includes a peripheral storage device 1030 and a host system 1035. The map display system 1010, the GPS 1015, the electronic compass 1020, the dashboard display device 1025, and the optional peripheral storage device 1030 are physically located in a vehicle traveling a route (as indicated by the dotted line).

The map display system 1010 includes a vehicle orientation processor 1040, a storage unit 1045, a GPS interface 1050, an electronic compass interface 1055, a dashboard display device interface 1060, an optional peripheral storage interface 1065, an optional wireless communication controller 1070, and a system bus 1075. The vehicle orientation processor 1040 is a central processing unit (CPU) that processes executable instructions. The storage unit 1045 stores executable instructions and data.

The GPS interface 1050 is capable of exchanging messages with GPS 1015 through communications pathway 1080. The electronic compass interface 1055 is capable of exchanging information with electronic compass 1020 through a communication pathway 1081. Dashboard display device interface 1060 is capable of sending and receiving communications with the dashboard display device 1025 through a communications pathway 1082.

The peripheral storage interface 1065 is capable of sending and receiving communications with the peripheral storage device 1030 through a communications pathway 1083. The peripheral storage interface 1065 may be necessary only when the map display system 1010 includes a peripheral storage device 1030.

The wireless communication controller 1070 is capable of exchanging wireless communications with the host system 1035 through a wireless communications pathway 1084. The wireless communication controller 1070 only may be necessary when the map display system 1010 includes a host system.

The system bus 1075 provides a series of parallel connections to allow communication between the vehicle orientation processor 1040, the storage unit 1045, the GPS interface 1050, the electronic compass interface 1055, the dashboard display device interface 1060, the peripheral storage interface 1065, and the wireless communication controller 1070.

The GPS 1015 is capable of determining the location of the vehicle, such as the longitude and latitude of the vehicle. The GPS 1015 sends the location of the vehicle to the vehicle orientation processor 1040 using the communications pathway 1080, the GPS interface 1050, and the system bus 1075.

The electronic compass 1020 is capable of determining the direction in which the vehicle is traveling. The electronic compass 1020 sends the direction in which the vehicle is traveling to the vehicle orientation processor 1040 using the communications pathway 1081, the electronic compass interface 1055, and the system bus 1075.

The vehicle orientation processor 1040 accesses a route map. For example, the vehicle orientation processor 1040 may access a route map received from the host system 1035 using the communications pathway 1084, the wireless communication controller 1070, and system bus 1075. The vehicle orientation processor 1040 also may access a route map stored on media associated with the peripheral storage device 1030 using the communications pathway 1083, the peripheral storage interface 1065, and the system bus 1075.

The vehicle orientation processor 1040 receives messages from the GPS 1015 and the electronic compass 1020. The vehicle orientation processor 1040 uses those messages to determine the appropriate orientation of the route map relative to the dashboard display device 1025, as described previously with respect to FIGS. 7 and 8. The vehicle orientation processor 1040 may compare information about the current direction in which the vehicle is traveling as received from the electronic compass 1020 with information about the current displayed orientation of the map to determine whether the map orientation displayed on dashboard display device 1025 should be changed. When the map orientation should be changed, the vehicle orientation processor 1040 re-displays the map on the dashboard display device 1025 in the orientation appropriate for the direction that the vehicle is traveling. For example, the vehicle orientation processor 1040 may send the map in the appropriate orientation through system bus 1075 to the dashboard display device interface 1060. The dashboard display device interface 1060 then displays the appropriately oriented map using communication pathway 1082 to the dashboard display device 1025.

For example, the vehicle may be traveling toward the north after making a turn onto a particular road, and the particular road on which the vehicle is traveling may be depicted on the map displayed on the dashboard display device such that the road extends from the left side of the display to the right side of the display. The vehicle orientation processor 1040 may receive from the electronic compass 1020 a message that indicates the vehicle is traveling toward the north. The vehicle orientation processor 1040 may receive from the GPS 1015 a message that indicates the vehicle is located at a particular position. The vehicle orientation processor 1040 may determine the road on which the vehicle is located by comparing the location of the vehicle with locations included on the map displayed on the dashboard display device 1025. The vehicle orientation processor 1040 may determine whether the road on which the vehicle is traveling is depicted on the dashboard display device 1025 in an appropriate orientation. Specifically, the vehicle orientation processor 1040 may determine whether the road on which the vehicle is traveling is depicted with the northern portion of the road directed at the top of the display. If not, the vehicle orientation processor 1040 may send to the dashboard display interface 1060 using the system bus 1075 the map to be displayed in the correct orientation (e.g., the road on which the vehicle traveling is depicted as traversing from the bottom toward the top of the display). The dashboard display device interface 1060 then controls the dashboard display device 1025 to display the map in an appropriate orientation relative to the direction in which the vehicle is traveling.

It is important to note that the vehicle orientation processor 1040 does not necessarily control the display such that the vehicle is always traveling directly up. For example, the vehicle orientation processor may be constrained to rotating the depicted map in increments of 90°, and may select the orientation of the depicted map that causes movement of the vehicle to have the largest upward component. An indication of the orientation of the map (e.g., an indication of where North is) may be displayed.

The vehicle orientation processor 1040 also may determine whether a different map should be displayed on the dashboard display device 1025 based on the current position of the vehicle as indicated by a messages provided by the GPS 1015. When the vehicle orientation processor 1040 determines that a different map should be displayed, the vehicle orientation processor 1040 accesses the map, for example by communicating with the host system 1035 or by accessing media associated with peripheral storage device 1030. The vehicle orientation processor 1040 sends the map through system bus 1075 to the dashboard display device interface 1060. The dashboard display device interface 1060 then displays the map using communication pathway 1082 to the dashboard display device 1025.

In some implementations, the functions performed by the vehicle orientation processor 1040 may be performed by a processor that also performs other functions, such as a processor associated with an on-board navigation guidance system.

Although FIGS. 1-10 illustrate systems and methods for presenting a driving route, the techniques are not limited to driving routes. These techniques may be applicable to presenting a route for other modes of transportation (e.g., walking or bicycling). These techniques may be applicable, for example, to one or more computing devices used for presenting a preferred route that communicate in a client system and host system (e.g., an Internet access provider or an Internet service provider) relationship, a single computing device (e.g., with or without networking capabilities), or an embedded system (e.g., a navigation routing system in an automobile or other vehicle).

Although the techniques and concepts have been described in which a host system presents a travel route, another type of computing device also may be used to perform the described techniques and concepts. For example, a general-purpose computer accessible to a network, such as in a peer-to-peer relationship, an on-board navigation system in a vehicle, a general-purpose computer capable of accessing route data, or another trusted computer system may be used to perform the functions described as being performed by the host system.

Implementations may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following claims.

What is claimed is:

1. A computer-implemented method for displaying a route, the method comprising:
    displaying a map for a route in a ground-based vehicle, the map including a variable road network map showing finer detail for geographic features near the route and less detail for geographic features farther from the route;
    receiving a location of the ground-based vehicle from a global positioning system; and
    displaying an indication of the location of the ground-based vehicle on the displayed map.

2. The method of claim 1 further comprising:
    receiving an indication that the direction in which the ground-based vehicle is traveling has changed; and orienting the displayed map based on the travel direction change of the ground-based vehicle.

3. The method of claim 1 further comprising:
receiving a direction of ground-based vehicle travel from an electronic compass; and
determining whether the ground-based vehicle has changed direction based on the direction received.

4. The method of claim 2 wherein orienting the displayed map comprises orienting the displayed map such that the travel direction of the ground-based vehicle is toward the top of the displayed map.

5. The method of claim 4 wherein orienting the displayed map comprises orienting the displayed map such that a component of the travel direction of the ground-based vehicle is toward the top of the displayed map.

6. A non-transitory computer-readable storage medium having embodied thereon a computer program configured to display a route, the medium comprising one or more code segments configured to:
display a map for a route in a ground-based vehicle, the map including a variable road network map showing finer detail for geographic features near the route and less detail for geographic features farther from the route;
receive a location of the ground-based vehicle from a global positioning system; and
display an indication of the location of the ground-based vehicle on the displayed map.

7. The medium of claim 6 wherein the one or more code segments are further configured to:
receive an indication that the direction in which the ground-based vehicle is traveling has changed; and
orient the displayed map based on the travel direction change of the ground-based vehicle.

8. The medium of claim 6 wherein the one or more code segments are further configured to:
receive a direction of ground-based vehicle travel from an electronic compass; and
determine whether the ground-based vehicle has changed direction based on the direction received.

9. The medium of claim 6 wherein the one or more code segments are configured to orient the displayed map such that the travel direction of the ground-based vehicle is toward the top of the displayed map.

10. The medium of claim 6 wherein the one or more code segments are configured to orient the displayed map such that a component of the travel direction of the ground-based vehicle is toward the top of the displayed map.

11. A system for displaying a route, the system a processor connected to a storage device and one or more input/output devices, wherein the processor is configured to:
display a map for a route in a ground-based vehicle, the map including a variable road network map showing finer detail for geographic features near the route and less detail for geographic features farther from the route;
receive a location of the ground-based vehicle from a global positioning system; and
display an indication of the location of the ground-based vehicle on the displayed map.

12. The system of claim 11 wherein the processor is further configured to:
receive an indication that the direction in which the ground-based vehicle is traveling has changed; and
orient the displayed map based on the travel direction change of the ground-based vehicle.

13. The system of claim 11 wherein the processor is further configured to:
receive a direction of ground-based vehicle travel from an electronic compass; and
determine whether the ground-based vehicle has changed direction based on the direction received.

14. The system of claim 11 wherein the processor is configured to orient the displayed map such that the travel direction of the ground-based vehicle is toward the top of the displayed map.

15. The system of claim 11 wherein the processor is to orient the displayed map such that a component of the travel direction of the ground-based vehicle is toward the top of the displayed map.

16. A system for displaying a route, the system comprising:
a means for displaying a map for a route in a ground-based vehicle, the map including a variable road network map showing finer detail for geographic features near the route and less detail for geographic features farther from the route;
a means for receiving a location of the ground-based vehicle from a global positioning system; and
a means for displaying an indication of the location of the ground-based vehicle on the displayed map.

17. The system of claim 16 further comprising:
a means for receiving an indication that the direction in which the ground-based vehicle is traveling has changed; and
a means for orienting the displayed map based on the travel direction change of the ground-based vehicle.

* * * * *